United States Patent
Hart et al.

(10) Patent No.: US 9,999,034 B2
(45) Date of Patent: *Jun. 12, 2018

(54) UPLINK MULTI-USER-MIMO WITHOUT CLIENT ASSISTANCE

(71) Applicant: Cisco Technology, Inc., San Jose, CA (US)

(72) Inventors: Brian D. Hart, Sunnyvale, CA (US); Matthew A. Silverman, Shaker Heights, OH (US); Paul J. Stager, Akron, OH (US); David Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/407,565

(22) Filed: Jan. 17, 2017

(65) Prior Publication Data

US 2017/0127407 A1 May 4, 2017

Related U.S. Application Data

(63) Continuation of application No. 14/796,001, filed on Jul. 10, 2015, now Pat. No. 9,584,278.

(51) Int. Cl.
*H04B 7/02* (2018.01)
*H04B 7/04* (2017.01)
(Continued)

(52) U.S. Cl.
CPC ...... *H04W 72/0413* (2013.01); *H04B 7/0452* (2013.01); *H04B 7/0626* (2013.01); *H04W 72/042* (2013.01); *H04W 84/12* (2013.01)

(58) Field of Classification Search
CPC ..... H04B 7/0452; H04B 7/024; H04L 5/0055; H04W 72/042
(Continued)

(56) References Cited

U.S. PATENT DOCUMENTS 8,676,144 B2    3/2014   Guo et al.
9,584,278 B2 *  2/2017   Hart ..................... H04L 5/0048
(Continued)

OTHER PUBLICATIONS

Bejarano et al., "Scaling Multi-User MIMO WLANs: The Case for Concurrent Uplink Control Messages", IEEE International Conference on Sensing, Communication, and Networking, Jun. 22-25, 2015, 9 pages.

(Continued)

*Primary Examiner* — David S Huang
(74) *Attorney, Agent, or Firm* — Edell, Shapiro & Finnan, LLC

(57) ABSTRACT

A method is provided in which a first wireless access point selects two or more of a plurality of client devices based on similarity of receive signal strength and carrier frequency offset with respect to the first wireless access point, and sends a downlink multi-user multiple-input multiple-output (MIMO) transmission to the two or more client devices. The downlink multi-user MIMO transmission is configured to solicit acknowledgments from the two or more client devices. The acknowledgments are received at a plurality of antennas of the first wireless access point from the two or more client devices. Uplink multi-user MIMO processing of the acknowledgments is performed from the two or more of the plurality of client devices to recover the acknowledgments respectively from each of the two or more client devices.

20 Claims, 6 Drawing Sheets

(51) Int. Cl.
 *H04L 5/00* (2006.01)
 *H04W 72/04* (2009.01)
 *H04B 7/0452* (2017.01)
 *H04B 7/06* (2006.01)
 *H04W 84/12* (2009.01)

(58) Field of Classification Search
 USPC .......................................................... 375/267
 See application file for complete search history.

(56) References Cited

U.S. PATENT DOCUMENTS

| | | |
|---|---|---|
| 2014/0241240 A1 | 8/2014 | Kloper et al. |
| 2015/0063190 A1 | 3/2015 | Merlin et al. |
| 2015/0327121 A1 | 11/2015 | Li et al. |
| 2017/0012752 A1 | 1/2017 | Hart et al. |

OTHER PUBLICATIONS

Favalli et al., "Frequency Domain Estimation and Compensation of Intercarrier Interference in OFDM Systems", Spread Spectrum Techniques and Applications, ISSSTA '08. IEEE 10th International Symposium on, Sep. 2008 pp. 470-474, 5 pages.

* cited by examiner

… (1)

UPLINK MULTI-USER-MIMO WITHOUT CLIENT ASSISTANCE

CROSS-REFERENCE TO RELATED APPLICATION

This application is a continuation of U.S. application Ser. No. 14/796,001, filed Jul. 10, 2015, which is incorporated herein by reference in its entirety.

TECHNICAL FIELD

The present disclosure relates to wireless communication systems.

BACKGROUND

The IEEE 802.11ac specification defines downlink Multi-User Multiple Input Multiple Output (MU-MIMO) but not uplink MU-MIMO (UL-MU-MIMO). UL-MU-MIMO is a way to "add capacity" by using the spatial resources at a wireless access point to receive multiple parallel transmissions from client devices.

DESCRIPTION OF EXAMPLE EMBODIMENTS

Overview

Figure 1:
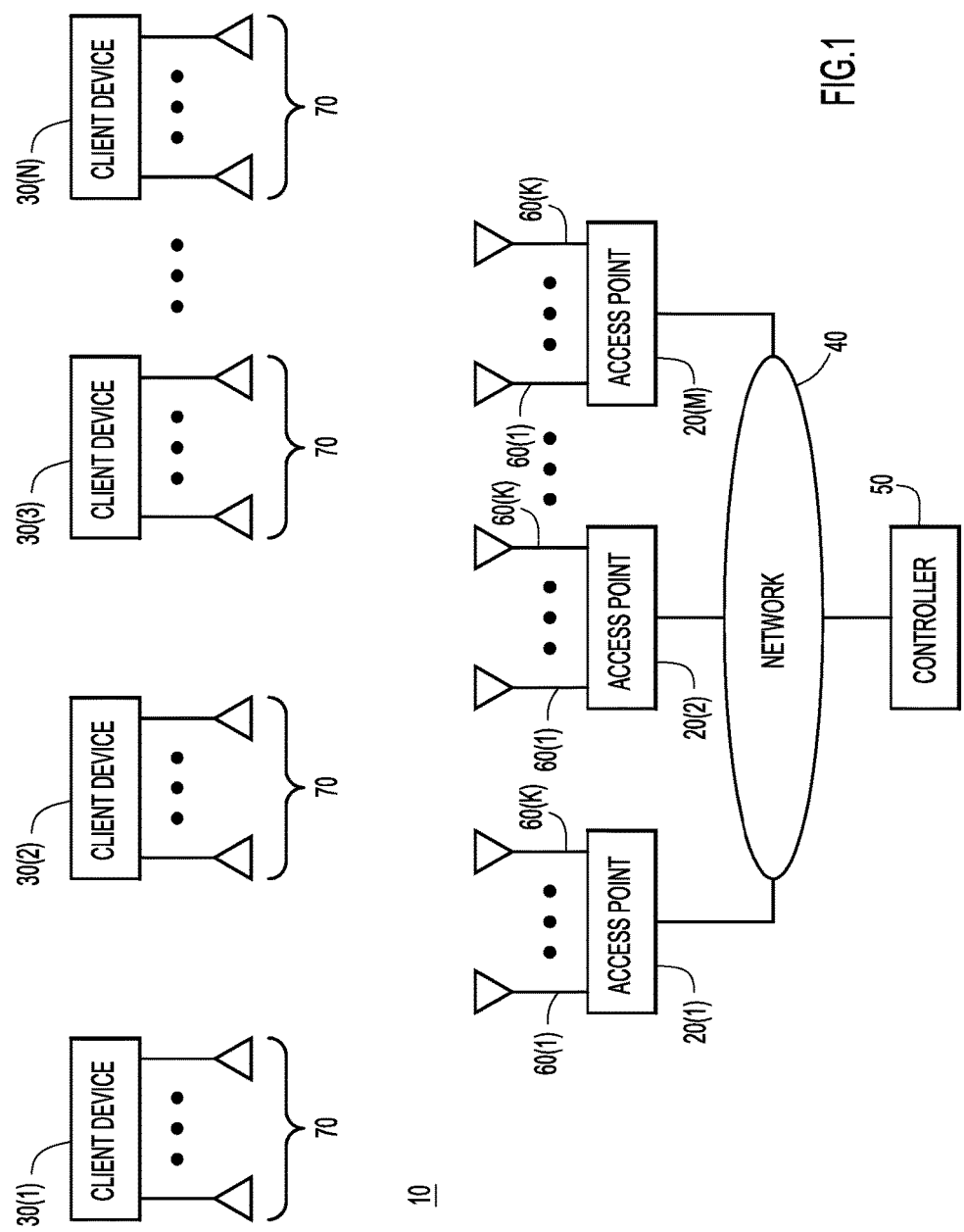
FIG. 1 is diagram of a wireless network system in which UL-MU-MIMO is achieved without client assistance, according to an example embodiment.

In accordance with an embodiment, a method is provided in which a first wireless access point selects two or more of a plurality of client devices based on similarity of receive signal strength and carrier frequency offset with respect to the first wireless access point, and sends a downlink multi-user multiple-input multiple-output (MIMO) transmission to the two or more of the plurality of client devices. The downlink multi-user MIMO transmission is configured to solicit acknowledgments from the two or more of the plurality of client devices. The acknowledgments are received at a plurality of antennas of the first wireless access point from the two or more of the plurality of client devices. Uplink multi-user MIMO processing of the acknowledgments is performed from the two or more of the plurality of client devices to recover the acknowledgments from each of the two or more of the plurality of client devices.

Example Embodiments

Presented herein are techniques for receiving UL-MU-MIMO acknowledgments (ACKs) or Block ACK (BAs) following a DL-MU-MIMO transmission, where the DL-MU-MIMO transmission explicitly requests a BA or ACK a Short-Interframe Space (SIFS) after the end of the DL-MU-MIMO transmission. The DL-MU-MIMO transmission may follow the IEEE 802.11ac PHY format or be a beamformed/null-steered superposition of different single-user Presentation Protocol Data Units (PPDUs) padded to the same transmit time (TXTIME).

Processing same-time and same-frequency (channel) and spatially separated ACKs and/or BAs to a DL-MU-MIMO transmission can significantly increase the efficiency of DL-MU-MIMO. Processing spatially separated polled beamformed feedback frames sent in response to a Null Data Packet Announcement/Null Data Packet (NDPA/NDP) sequence can avoid another significant source of media access control inefficiency.

These specific cases are simplifying since (a) which client devices are transmitting can be controlled, (b) the channel state information (CSI) for the client devices is known via sounding (since, in the DL-MU-MIMO case, a MU protocol data unit MU PPDU) was just transmitted to them; in the polled beamforming feedback case some moderately stale sounding information may be available), (c) the carrier frequency offsets (CFOs), obtained from the recent sounding is known, and d) there is relatively high confidence that the response was generated in hardware a SIFS interval after the end of the MU PPDU, so the response is symbol aligned (to well within the cyclic prefix duration). Even the first case above is still a valuable subset of the wider problem since there are many short frames to transmit to many clients (Doman Name System responses, service discovery messages, etc.), and the IEEE 802.11ac DL-MU-MIMO Block ACK Request/Block ACK (BAR/BA) exchanges to each recipient are relatively very expensive in terms of use of the wireless medium given the high PHY rate such that there might only be 1-2-3 OFDM symbols worth of data in the preceding DL-MU-MIMO transmission. With the above known information, simultaneous ACKs/BAs can be received by the processing detailed herein.

Presented herein are techniques for implicit/explicit sounding (and measuring carrier frequency offsets) followed by transmitting a downlink multi-user MIMO (DL-MU-MIMO) transmission to two or more client devices, and receiving uplink multi-user MIMO (UL-MU-MIMO) acknowledgements from two or more client devices, all within a few ten or hundred milliseconds, during which both the channel transfer function (CTF) and carrier frequency offset (CFO) will not have changed much.

Referring first to FIG. 1, a diagram is shown of a wireless communication system or network 10 that includes a plurality of wireless access points 20(1)-20(M) and a plurality of wireless client devices 30(1)-30(N). The wireless access points 20(1)-20(M) are connected to a network (e.g., a local area network) 40. There is also a controller 50 that is connected to the network 40 and is provided to perform control over the access points 20(1)-20(M) as well as other functions, as described herein. Each of the wireless access points 20(1)-20(M) has a plurality of antennas 60(1)-60(K), and each client device 30(1)-30(N) has one or more antennas 70. The client devices 30(1)-30(N) are also referred to as "clients".

DL-MU-MIMO techniques can be used for an access point, such as access point 20(1), to simultaneously transmit multiple data frames intended to different client devices (e.g., client devices 30(1), 30(2) and 30(3)), by exploiting spatial multiplexing that can be achieved through appropriate weights applied to the subcarriers that carry encoded data frames before transmitted from the plurality of antennas of the access point. The access point needs to have reliable channel state information (CSI) for each of the client devices, but this may have been obtained from prior transmissions with the client devices.

In order for the access point to determine that the data frames were received by the respective client devices, each client device needs to send an acknowledgement (ACK) frame or block ACK (BA) frame. Conventional techniques for transmission of the ACKs or BA frames involve each client device separately and sequentially sending an ACK or BA frame to the access point. This uses more time on the wireless medium, and can be detrimental to network performance.

However, it has been determined through modeling and experimentation that when an access point sends a DL-MU-MIMO transmission, that access point has enough channel state information and carrier frequency offset information for the two or more client devices that are targets of the DL-MU-MIMO transmission such that the access point can perform UL-MU-MIMO processing for those two or more client devices. That is, the access point could cause the two or more client devices to immediately transmit ACKs or BAs simultaneously to the access point, without the need for any operational changes needed at the client devices. Techniques are presented herein that allow for an access point to cause two or more clients to participate in an UL-MU-MIMO transmission (to send ACKs or BAs) without the need for any changes to the client devices. Thus, legacy client devices could participate in an UL-MU-MIMO transmission. UL-MU-MIMO processing is performed at the access point (or at a separate controller) to recover all of the ACKs/BAs. These techniques facilitate much more efficient use of the wireless medium. This is particularly valuable in high density environments, such as stadiums, university lecture theatres, etc.

Figure 2:
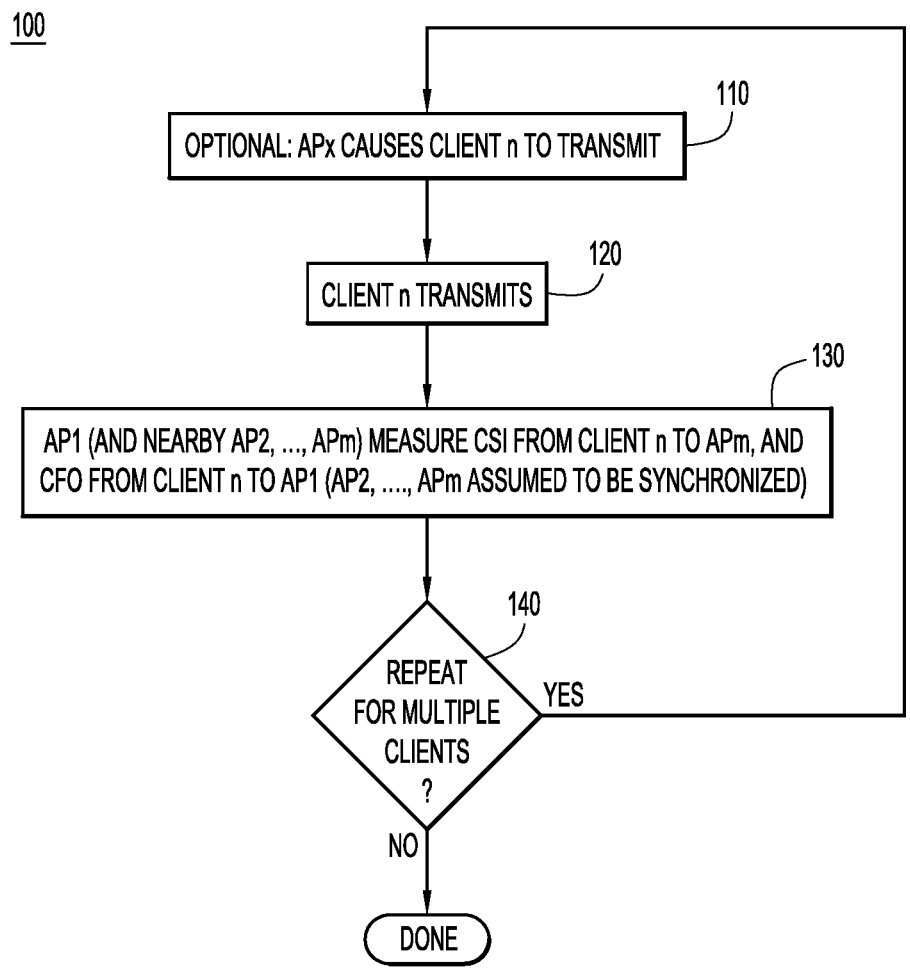
FIGS. 2 and 3 are flow charts depicting operations of the UL-MU-MIMO techniques according to an example embodiment.
Figure 3:
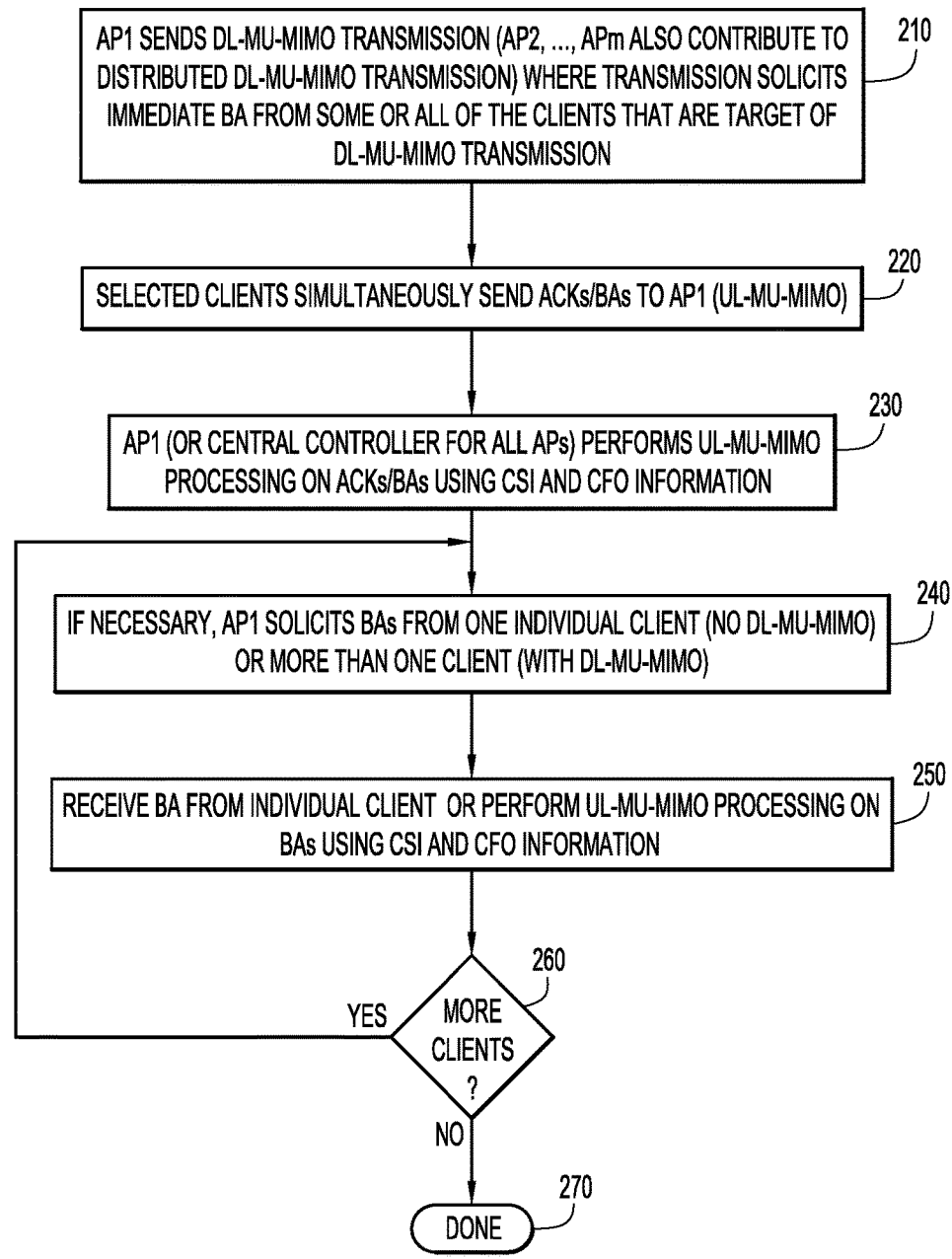
Figure 4:
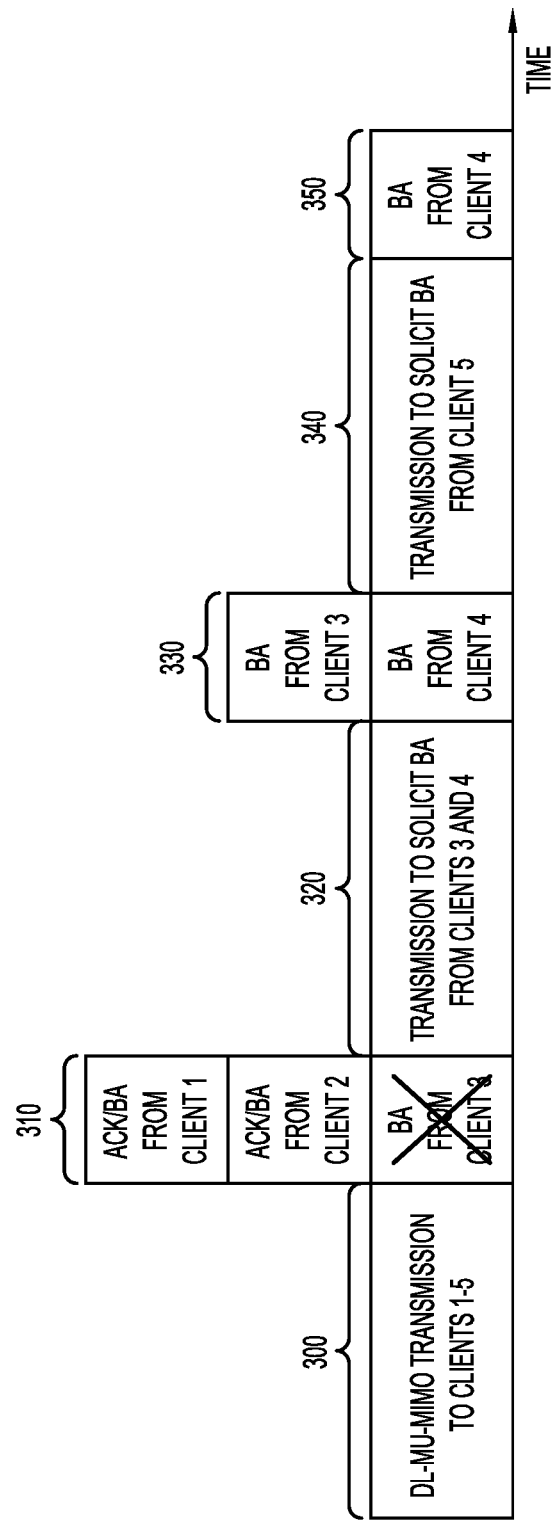
FIG. 4 is a timing diagram illustrating an example of the UL-MU-MIMO techniques according to an example embodiment.

Reference is now made to FIGS. 2-4 for a description of flow charts that depict the operations performed at an access point. FIG. 2 illustrates a flow chart for a method 100 by which an access point (or multiple access points) can obtain CSI and CFO information for a given client device or multiple client devices. Step 110 is an optional step and involves an arbitrary access point, denoted APx, among a plurality of access points at a given wireless network deployment, sending a frame to a given client device, denoted "client n" to transmit a frame in order to measure CSI and/or CFO information. At 120, the given client device transmits a frame. It is noted that step 120 may occur without step 110 insofar as it is common for a client device to transmit a frame from time-to-time to an access point for any of a variety of reasons. At 130, a given access point, e.g., AP1, that receives the transmission from "client n" measures CSI with respect to "client n" and CFO information with respect to "client n" assuming all of the other access points are synchronized (with respect to a carrier frequency). Moreover, at step 130, any access point that receives the transmission from "client n" can also measure CSI and CFO information. The CSI and CFO information may be stored at a central controller apparatus, e.g., controller 50 shown in FIG. 1. In one form, the controller apparatus may be co-located with one of the plurality of APs.

The process shown in FIG. 2 may repeat for multiple client devices so that any given access point or multiple access points that receive a transmission from a given client device can determine CSI and CFO with respect to that client device.

Reference is now made to FIG. 3. FIG. 3 illustrates a flow chart for a method 200 by which an access point causes multiple client devices to participate in an UL-MU-MIMO transmission in response to a DL-MU-MIMO transmission. At 210, a given access point, e.g., access point 20(1) also denoted as AP1, sends a DL-MU-MIMO transmission to two or more client devices, and the DL-MU-MIMO transmission solicits immediate ACKs/BAs from selected two or more of the client devices that are the target destination of the DL-MU-MIMO transmission according to the Wi-Fi® Alliance (WFA) Wi-Fi Multimedia (WMM) protocol or IEEE 802.11 protocol (e.g. the absence of a QoS control field implies an immediate ACK is solicited; or the QoS Control field is present and the contained Ack Policy subfield indicates a request for a normal ACK or a BA). The client devices that the access point selects to participate in the UL-MU-MIMO transmission of ACKs/BAs may be two or more clients with similar received signal strengths and CFO and different multipath (CSI)). This ensures that the access point will be able to spatially decompose and recover the ACKs/BAs sent simultaneously from the two or more client devices. It is also possible that one or more other access points (denoted AP2, . . . , APm) may contribute in the DL-MU-MIMO by way of a so-called distributed DL-MU-MIMO transmission).

At 220, the two or more client devices selected to participate in the UL-MU-MIMO transmission simultaneously transmit an ACK or BA.

At 230, the access point 20(1) performs UL-MU-MIMO processing of the acknowledgments from the two or more client devices to recover the acknowledgments respectively from each of the two or more client devices using the CSI and CFO information for the two or more client devices. It is also envisioned that the processing at 230 may be performed by a controller, e.g., controller 50 shown in FIG. 1. In this latter scenario, the access point 20(1) would upload data to the controller 50 to enable the controller 50 to perform the computations to recover the individual ACKs or BAs from the two or more client devices. Still another example of centralizing some of the processing is described below in connection with FIG. 6. In any case, the UL-MU-MIMO processing performed at 230 is based on already-determined channel state information and carrier frequency offset information for two or more clients.

It is possible that the access point 20(1) may have not been able to sufficiently recover the BA from one of the client devices that the access point selected to participate in the UL-MU-MIMO transmission. Alternatively, the access point 20(1) may seek to receive a BA from a client device that was a destination of the DL-MU-MIMO transmission but was not selected to participate in the UL-MU-MIMO transmission (based on a variety of reasons, such as receive signal strength or CSI).

In this case, operations 240-260 are performed. It should be understood that operations 240-260 are not always needed. At 240, the access point 20(1) solicits a BA from one or more individual client devices, such as by transmitting a BAR frame to each client device. If two or more clients are solicited, then the BAR frame is transmitted via DL-MU-MIMO, otherwise it is transmitted with no DL-MU-MIMO, such as by single user MIMO. At 250, the selected individual client device transmits its BA and access point 20(1) receives it, or the AP performs UL-MU-MIMO processing on BAs using CSI and CFO information.

At 260, the access point 20(1) determines whether it needs to solicit a BA individually from more client device(s), and if so, steps 240 and 250 are repeated. Eventually the process ends at step 270 when no there are no more client devices for which a BA is to be individually solicited.

Reference is now made to FIG. 4. FIG. 4 illustrates a timing diagram for an example where a given access point sends a DL-MU-MIMO transmission to five client devices (denoted Clients 1-5) and selects Clients 1-3 to send ACK/BAs during an UL-MU-MIMO session, whereas Clients 4 and 5 are not selected to be part of the UL-MU-MIMO participants. For example, the CSI or RSSI for Clients 4 and 5 may be such that it is not practical to include Clients 4 and 5 in the UL-MU-MIMO group. This may change from time-to-time depending on the location of a client device with respect to an access point. At 300, the DL-MU-MIMO transmission is sent. The data frames of the DL-MU-MIMO transmission include information configured to cause Clients 1-3 to immediately and simultaneously transmit ACKs/BAs to the access point. At 310, Clients 1-3 simultaneously transmit ACKs/BAs to the access point as a UL-MU-MIMO transmission. Client 1 does not know that Clients 2 and 3 are going to be transmitting an ACK/BA at the same time. Likewise, Client 2 does not know that Clients 1 and 3 are going to be transmitting an ACK/BA at the same time. Similarly, Client 3 does not know that Clients 1 and 2 are going to be transmitting an ACK/BA at the same time. Clients 1-3 just transmit their ACKs/BAs via their one or more antennas. The access point receives the ACKs/BAs sent simultaneously by Clients 1-3.

In the example, it is assumed that the AP is not able to receive the ACK/BA from client 1 (henceforth assumed to be a BA). Since Client 4 and 5 were not selected to participate in the UL-MU-MIMO transmission, at 320, the access point transmits a frame to both Client 3 and Client 4 to solicit a BA from Clients 3 and 4, and at 330, Clients 3 and 4 transmit BAs. Similarly, at 340, the access point transmits a frame to Client 5 and at 350, Client transmits the BA.

Figure 5:
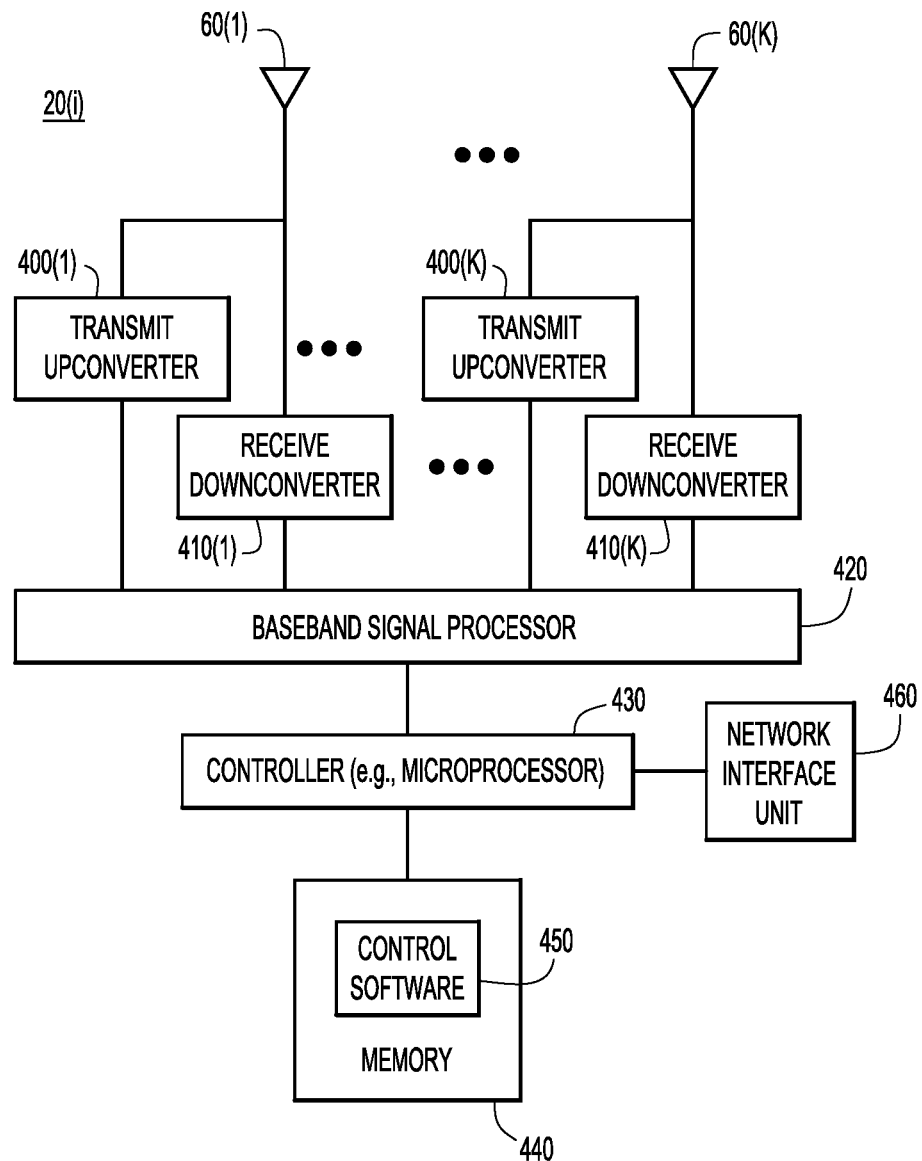
FIG. 5 is a block diagram of a wireless access point configured to perform the UL-MU-MIMO techniques according to an example embodiment.

Reference is now made to FIG. 5 which illustrates a block diagram of a wireless access point 20(i) representative of any of the access points shown in FIG. 1 configured to perform the operations described above in connection with FIGS. 1-4. The access point includes the plurality of antennas 60(1)-60(K), a plurality of transmit upconverters 400(1)-400(K) each connected to a corresponding one of the antennas 60(1)-60(K) and a plurality of receive downconverters 410(1)-410(K) each connected to a corresponding one of the antennas 60(1)-60(K). A baseband signal processor 420 (e.g., modem) is provided that is connected to the plurality of transmit upconverters 400(1)-400(K) and the plurality of receive downconverters 410(1)-410(K). The baseband signal processor 420 performs the baseband transmit signal processing of signals to be transmitted via the plurality of antennas 60(1)-60(K), e.g., for DL-MU-MIMO and single user transmissions, and performs the baseband receive processing of signals that are received by the plurality of antennas 60(1)-60(K). The baseband signal processor 420 may take the form of one or more integrated circuits including fixed or programmable digital logic gates to perform various functions such as analog-to-digital conversion, digital-to-analog conversion, Fast Fourier Transform, etc.

The access point 20(i) further includes a controller 430 that may take the form of one or more microprocessors or microcontrollers. A memory 440 is provided that stores instructions for control software 450. There also is a network interface unit 460 that enables wired network connectivity for the access point 20(i).

The memory 440 may include read only memory (ROM), random access memory (RAM), magnetic disk storage media devices, optical storage media devices, flash memory devices, electrical, optical, or other physical/tangible memory storage devices. Thus, in general, the memory 440 may include one or more tangible (non-transitory) computer readable storage media (e.g., a memory device) encoded with software comprising computer executable instructions and when the software is executed (by the controller 430) it is operable to perform the operations described herein.

The signal processing described herein for selecting client devices to participate in an UL-MU-MIMO transmission to the access point and to process the received signals of an UL-MU-MIMO transmission from two or more client devices may be performed by the baseband signal processor 420 alone using digital signal processing techniques, the controller 430 alone, or partly by the baseband signal processor 420 and party by the controller 430. In one form, the baseband signal processor 420 is implemented in one or more application specific integrated circuits (ASICs).

Figure 6:
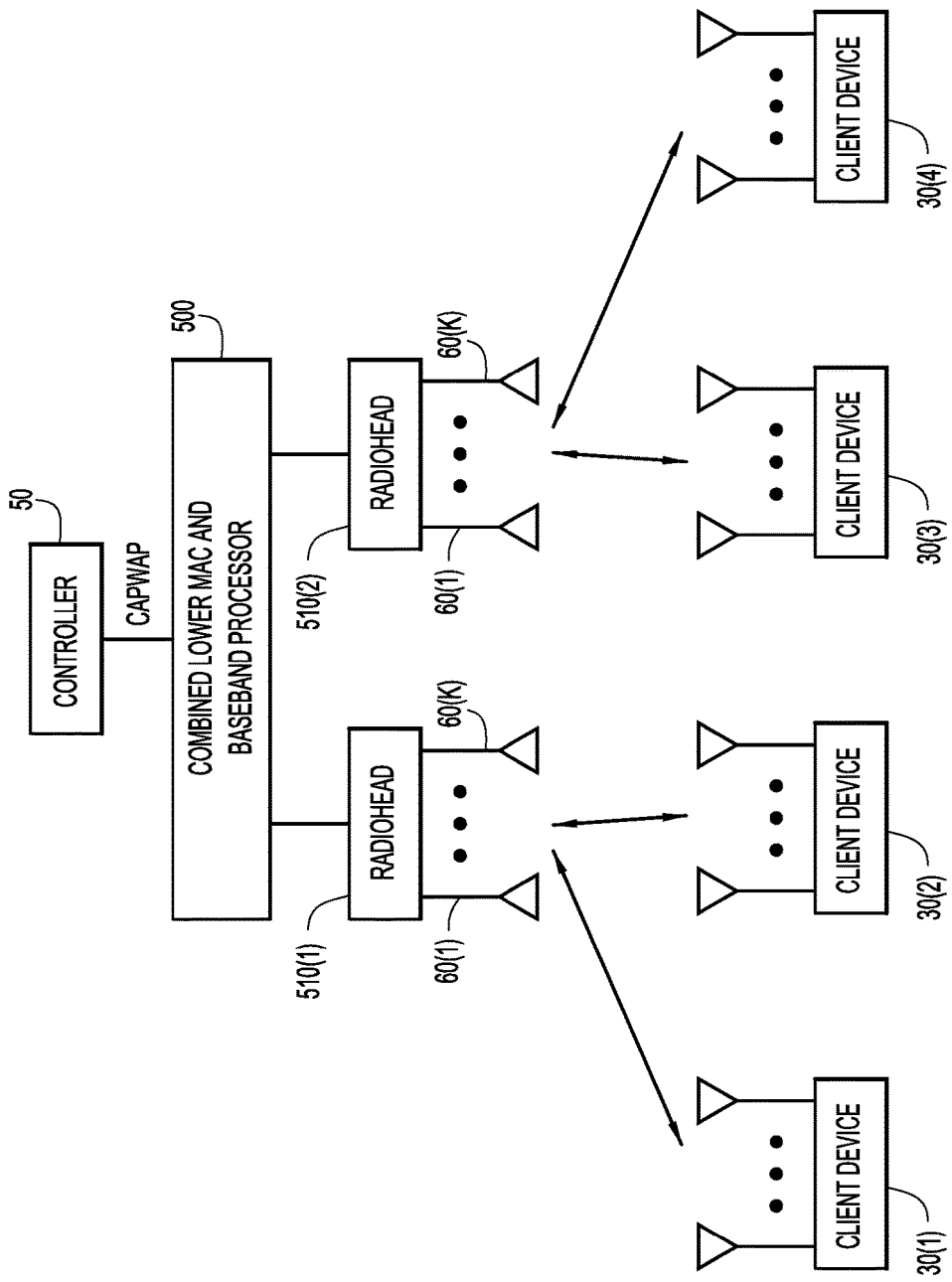
FIG. 6 is a diagram of a variation to the system shown in FIG. 1, in which lower media access control and baseband signal processing functions are centralized, according to an example embodiment.

Reference is now made to FIG. 6. FIG. 6 shows a variation of FIG. 1 whereby the lower media access control and baseband processing functions are centralized in a combined lower media access control and baseband processor 500 and each access point thereby reduces to what is referred to as a "radiohead". Two radioheads 510(1) and 510(2) are shown in FIG. 6. Each radiohead includes transmit upconverters 400(1)-400(K), receive downconverters 410(1)-410(K), analog-to-digital and digital-to-analog converters, antennas 60(1)-60(K) and network interface unit 460, which are shown in FIG. 5. Each of the radioheads 510(1) and 510(2) communicates with the combined lower media access control and baseband processor 500 by way of a wired network, which serves as a low latency interface. The controller 50 centralizes the upper media access control functions. The combined lower media access control and baseband processor 500 performs the intense and scalable digital signal processing functions that are needed for the DL-MU-MIMO and UL-MU-MIMO functions described herein, and scheduling functions.

The following section presents a mathematical derivation of the techniques presented above. The uplink multi-user MIMO techniques presented herein are distinctive for one or more of several reasons. First, the downlink multi-user MIMO transmission includes a preamble that does not support user separation. For example, a standard (unchanged) IEEE 802.11a, IEEE 802.11n or IEEE 802.11ac preamble may be used. Second, a Media Access Control (MAC) protocol between the first wireless access point and the plurality of client devices is used such that two or more of a plurality of client devices are unaware that each may be simultaneously transmitting an acknowledgment but which acknowledgments from the two or more of the plurality of client devices are aligned within a cyclic extension interval. As an example, a standard (unchanged) IEEE 802.11 MAC protocol may be used yet still causes clients to transmit frames at essentially identical times (i.e., aligned to within the cyclic extension interval). Third, the plurality of clients need not support carrier frequency alignment to a reference, such as an access point or base station. As a result, a standard (unchanged) IEEE 802.11a, IEEE 802.11n or IEEE 802.11ac transmit physical layer (PHY) may be used in the clients. Fourth, the operation of the access point, with respect to two or more of a plurality of client devices, is at a range such that per-client ranging is not required and yet alignment of the acknowledgments (at the same time within the cyclic extension interval) simultaneously transmitted by the two or more clients is preserved.

Derivation of UL-MU-MIMO without Client Assistance

It should be understood that there may be other mathematical derivations.

Definitions:

Symbols: AP is receiver, Client Devices are transmitters. AP can be local or DIDO.
CFO: Carrier Frequency Offset
CIR: Channel Impulse Response
CSI: Channel State Information (equivalent to CTF or CIR)
CTF: Channel Transfer Function (=CSI)
DIDO: Distributed in (DI)/Distributed out (DO)
FT/DFT/FFT: (Discrete/Fast) Fourier Transform
ICI: Inter Carrier Interference
IFT/IDFT/IFFT: Inverse (Discrete/Fast Fourier Transform
ISI: Inter Symbol Interference (OFDM)
MAC: Multiply-accumulates
SISO: Single in (SI)/single out (SO)

Primary Terms:
  Received signal in the time domain: y
  Received signal in the frequency domain: Y
  Transmitted constellation points: X
  Channel impulse response: h
  Channel transfer function (aka CSI) measured using global time (0 CFO): H
  Channel transfer function measured according to CFO of transmitter: G
  Inter-carrier-interference matrix: E
  Transmitter time offset: τ
  Transmitter phase offset relative to when the CSI was previously measured: θ

Secondary Terms
  Subcarrier frequency: fΔ
  OFDM symbol period (before cyclic prefix): T (=1/fΔ)
  Sample time: Ts (e.g. 1/20 MHz), (=T/N=1/(NfΔ))
  Carrier frequency offset (CFO) of user i: fi
  Carrier frequency offset of AP: fa Sub/superscripts:
  User: subscript i, i=1, . . . I
  Transmitter subcarrier: subscript k, k=1, . . . K. Transmitters are assumed SI (MI clients can be a collection of SIs)
  Receiver subcarrier: subscript l, l=1, . . . L (L=K)
  Receiver antenna: subscript r, r=1, . . . R
  Sampled time: n General:
  Sqrt(-1): j
  Continuous time: t
  Frequency: f (or λ in a convolution)
  FFT size: N
  Delta function: δ(.)
  Convolution: *
  eye(R): Identity matrix of size R*R Scalar Derivation Start with continuous time representation of one OFDM symbol, then convert to discrete using first principles (sampling in time, sampling in frequency).

Having multiple transmitters, whose constellation points are Inverse Fourier Transformed to a subcarrier frequency, with a per transmitter CFO, they pass through a multipath channel, and are received at the access point's (with CFO) and sampled in time:

$$y_{a,r}(t) = \sum_{i=1}^{I} \left\{ \left[ \sum_{k=1}^{K} X_{i,k} \exp(j2\pi(kf_\Delta + f_i)(t - \tau_i) + j\theta_i) * h_{i,r}(t) \right] \exp(-j2\pi f_a t) \right\}$$

$$\sum_{n=0}^{N-1} \delta(t - nT_s)$$

Assumptions are that:
h(t) has effectively bounded extent, for example, from 0 to $T_h$.
$\tau_i$ has effectively bounded variation across the users, for example, from 0 to $\tau_{max}$.
Not shown, but implied is that the Inverse Discrete Fourier Transform (IDFT) is windowed. The window starts before $-T_h-\tau_{max}$ (cyclic prefix) and continues to $NT_s$ at least.
In this way the sampling (the RHS summation over δ(.)) is confined to "steady-state".
After a Fourier transform, we have:

$$Y_{a,r}(f) = \sum_{i=1}^{I} \left\{ \left[ \sum_{k=1}^{K} X_{i,k} \exp(-j2\pi(kf_\Delta + f_i)\tau_i + j\theta_i) \delta(f - (kf_\Delta + f_i)) H_{i,r}(f) \right] * \right.$$

$$\left. \delta(f + f_a) \right\} * \sum_{n=0}^{N-1} \exp(-j2\pi n f T_s)$$

Applying the first convolution by δ(f+$f_d$), we have:

$$Y_{a,r}(f) = \sum_{i=1}^{I} \left\{ \sum_{k=1}^{K} X_{i,k} \exp(-j2\pi(kf_\Delta + f_i)\tau_i + j\theta_i) \right.$$

$$\left. \delta((f + f_d) - (kf_\Delta + f_i)) H_{i,r}(f + f_a) \right\} * \sum_{n=0}^{N-1} \exp(-j2\pi n f T_s)$$

Define $P_{i,k} = \exp(-j2\pi(kf_\Delta + f_i)\tau_i + j\theta_i)$. Rearranging and expanding the remaining convolution, we have:

$$Y_{a,r}(f) = \sum_{i=1}^{I} \int \sum_{k=1}^{K} X_{i,k} P_{i,k}$$

$$\sum_{n=0}^{N-1} \delta((\lambda + f_a) - (kf_\Delta + f_i)) H_{i,r}(\lambda + f_a) \exp(-j2\pi n(f - \lambda)T_s) d\lambda$$

The delta function forces $\lambda = kf_\Delta + f_i - f_a$, so:

$$Y_{a,r}(f) = \sum_{i=1}^{I} \sum_{k=1}^{K} X_{i,k} P_{i,k} H_{i,r}$$

$$(kf_\Delta + f_i - f_a + f_d) \sum_{n=0}^{N-1} \exp(-j2\pi n(f - (kf_\Delta + f_i - f_a))T_s)$$

The $f_a$'s cancel. Define $G_{i,r}(f) = H_{i,r}(f+f_i)$. $G_{i,r}(f)$ is simple and observable: it is the CTF that a receiver would measure during the training symbols, after having performed fine carrier recovery. Thus:

$$Y_{a,r}(f) = \sum_{i=1}^{I} \sum_{k=1}^{K} X_{i,k} P_{i,k} G_{i,r}(kf_\Delta) \sum_{n=0}^{N-1} \exp(-j2\pi n(f - (kf_\Delta + f_i - f_a))T_s)$$

Sampling this in frequency, we have:

$$Y_{a,r}(lf_\Delta) =$$

$$\sum_{i=1}^{I} \sum_{k=1}^{K} X_{i,k} P_{i,k} G_{i,r}(kf_\Delta) \sum_{n=0}^{N-1} \exp(-j2\pi n(lf_\Delta - kf_\Delta - f_i + f_a)T_s)$$

$$Y_{a,r,l} = \sum_{i=1}^{I} \sum_{k=1}^{K} X_{i,k} P_{i,k} G_{i,r,k} \sum_{n=0}^{N-1} \exp\left(j2\pi \frac{n}{N}\left(k - l + \frac{f_i - f_a}{f_\Delta}\right)\right)$$

Define the inter-carrier interference quantity as $$E_{a,l,i,k} = \sum_{n=0}^{N-1} \exp\left(j2\pi \frac{n}{N}\left(k - l + \frac{f_i - f_a}{f_\Delta}\right)\right).$$

Ideally $E_{a,l,i,k}$ would equal zero whenever k is not equal 1, but there is no control over the clients' carrier frequencies so this cannot be expected. $E_{a,l,i,k}$ resembles an aliased sinc(.) function in $$k - l + \frac{f_i - f_a}{f_\Delta},$$

that tapers towards zero for larger abs(k−1). Then $$Y_{a,r,l} = \sum_{k=1}^{K} \sum_{i=1}^{I} E_{a,l,i,k} G_{i,r,k} P_{i,k} X_{i,k}$$

gives a final description of the received FFT output at the AP as a function of the transmitted constellation points, multipath channel (in the frequency domain) and inter-subcarrier interference, for a given access point antenna and subcarrier. Additive noise is assumed but not shown.

Matrix Extension

A scalar equation can be formulated as vectors and matrices, towards designing a multi-user MIMO equalizer robust to client carrier offsets. The matrices can be constructed in several ways, according to how multiple subscripts are mapped to matrix indices. One construction is presented herein.

Define $X_k$ as the vertical concatenation of all $X_{i,k}$, i=1 ... I, for a given subcarrier k, so $X_k$ has size I*1. Define X as the vertical concatenation of $X_k$, k=1, ... K, so X has size (IK)*1.

Define $P_k$ as diag($P_{i,k}$, i=1, ... I, so $P_k$ has size (I)*(I). Define P as blockDiag($P_k$), k=1, ... K, so P has size (IK)*(IK).

PX is organized as a K*1 vectors of blocks, where each block is an I×1 vector of $P_{i,k}X_{i,k}$.

Define $G_{i,k}$ as the vertical concatenation of all $G_{i,r,k}$, r=1 ... R, for a given user i and subcarrier k, so $G_{i,k}$ has size R*1. Define $G_k$ as blockDiag($G_{i,k}$), i=1, ... I, so $G_k$ has size (IR)*(I). Define G as blockDiag(Gk), k=1, ... K, so G has size (IRK)*(IK).

GPX is organized as a K*1 vectors of blocks, where each block is an I×1 vector of subblocks, where each subblock is a R*1 vector of $G_{i,r,k}P_{i,k}X_{i,k}$.

Define $E_{a,l,k}$ as the horizontal concatenation of eye(R)$E_{a,l,i,k}$, i=1 ... I, for given subcarriers k and l, so $E_{a,l,k}$ has size R*(IR). Define $E_{a,l}$ as the horizontal concatenation of $E_{a,l,k}$, k=1 ... K, for a given subcarrier l, so $E_{a,l}$ has size R*(IRK). Define $E_a$ as the vertical concatenation of $E_{a,l}$, l=1, ... L, so $E_a$ has size (RL)*(IRK).

EGPX is organized as a L*1 vectors of blocks, where each block is an R×1 vector of $\Sigma_{k=1}^{K}\Sigma_{i=1}^{I}E_{a,l,i,k}G_{i,r,k}P_{i,k}X_{i,k}$.

Define $Y_{a,l}$ as the vertical concatenation of all $Y_{a,r,l}$, r=1 ... R, for a given subcarrier l, so $Y_{a,l}$ has size R*1. Define $Y_a$ as the vertical concatenation of $Y_{a,l}$, l=1, ... L, so $Y_a$ has size (RL)*1.

Then $Y_a = E_a GPX$ and $Y_{a,l} = E_l GPX$. That is, due to ICI expressed by $E_l$, subcarrier l is affected by the constellation symbols from all subcarriers (i.e. loss of orthogonality).

Equalizer Design and Implementation

Ea and G are known a priori. Once those are equalized, we are left with I single-user signals, so the usual long training fields and pilots can be used to correct for P.

As long as R>=I (or better, R>>I), we can solve PX using least squares (zero forcing):

$\widehat{PX} = (G^H E_a^H E_a G)^{-1} G^H E_a^H Y_a$ $E_a^H E_a$ and $G^H E_a^H E_a G$ are diagonally dominant, and the off diagonals decay in a sinc-like fashion. Complexity reduction by zeroing the far-off-diagonals was examined but zeroing more than about ⅓ of the far-off-diagonals significantly degraded the achieved EVM on $\widehat{PX}$ (i.e. although the off-diagonals are weak, there are many of them), so little complexity reduction seems achieveable by this path.

The next approach would be aggressively windowing the FFT input. This is normally avoided in Orthogonal Frequency Division Multiplexed (OFDM) systems since it introduces Inter Carrier Interference (ICI). But we have ICI already, and this can narrow the frequency span of strong ICI and so reduce computational complexity.

Meanwhile, for numerical stability (since the inverse operator is not numerically stable), one technique uses a QR decomposition on $E_a G$.

EaG can be computed since G is basically a diagonal matrix (albeit large) and entries in Ea, $$E_{a,l,i,k} = \sum_{n=0}^{N-1} \exp\left(j2\pi \frac{n}{N}\left(k - l + \frac{f_i - f_a}{f_\Delta}\right)\right),$$

can be determined from a lookup table. As well, there are numerous zeros/redundancy in Ea since it is constructed from eye(R)$E_{a,l,i,k}$. The input parameter $$k - l + \frac{f_i - f_a}{f_\Delta}$$

mod 1 is quantized to 7-10 bits, and the output I or Q values are each quantized to 8-11 bits (according to desired fidelity). If aggressive windowing is applied, Ea entries associated with large abs(k−1) can be forced to 0 also.

If we compute Ea(:,i,:) over all subcarriers k=0:63, l=0:63, we find it is both Toeplitz and unitary. Then products of these matrices are also unitary. However, given that one way to solve y=EaG(Px) in a least squares sense is to use a QR decomposition on EaG, then it is not necessary to invert Ea(:,i,:).

The size of EaG is RL*IK. The QR decomposition complexity of an m*n matrix is $(2m-2n/3)n^2$ multiplication-accumulations (MACs), so for R=4, I=3, K=52, then this is 7.6 MMACs. If we attempt to do this in, for example, 100 µs, this is 76 GMACs, or 190 multipliers at 400 MHz. High end FPGAs contain 2000-4000 DSP slices running at up to ~500 MHz, so this number of multipliers is not unreasonable.

If we (digitally) downconvert the received sample using a first user's CFO (rather than the receiving access point's native CFO), then EaG can be made partially upper diagonal, and QR complexity reduces by approximately $(R-1)^3/R^3$. For R=4, complexity is approximately halved. With windowing and zeroing the far-off-diagonals, as mentioned above, the solution is achieved approximately with reduced fidelity.

As well, if the PPDU soliciting the uplink ACK/BA is longer (e.g. N*100 µs), we can run the QR decomposition N times slower, and so attain N times fewer multipliers.

For ACK/BA reception, typically these frames are sent in non-High-Throughput format, and frequency-duplicated if in response to a wider bandwidth PPDU. So K=52 is a reasonable upper limit on the complexity there.

For multiple synchronized radioheads as shown in FIG. 6, R gets much larger than 4. e.g., 8 or 12 or 16. Complexity is proportional to R. If complexity becomes a problem for large R, in addition to the complexity reduction techniques listed above, a single antenna may be used from each extra radiohead, so R=5 or 6 or 7; or aggressively delete rows associated with a distant AP-client pair.

Ea has size (RL)*(IRK). It can be reordered and rendered as R diagonal blocks each of size L*IK. G has size (IRK)*(IK). It can also be reordered and rendered as a vertical concatenation of R identical IK*IK diagonal matrices.

To summarize, techniques are presented herein to achieve UL-MU-MIMO without client assistance. This is useful for ACKs and BAs sent by clients in response to a non-IEEE 802.11ac DL-MU-MIMO transmission, as well as to polled feedback after an NDPA/NDP sequence. An UL-MU-MIMO equalizer is described herein that can recover all the clients' ACKs/BAs even in the presence of significant CFO (e.g. up to 75% of one subcarrier or even more).

These techniques allow a wireless network to parallelize both uplink and downlink transmissions. This is the first viable uplink MU-MIMO technique for legacy clients heretofore known. This improves throughput in dense environments, especially for short downlink frames (aggregation not possible) where the ACKs/BAs are a significant overhead, and overhead from explicit CSI responses. These techniques may also be used to standard IEEE 802.11ac DL-MU-MIMO (ECBF) mode in elimination of redundant Beamforming Report Polls and parallelization of the Beamforming Report or ACK/BA messages.

In summary, in one aspect, a method is provided comprising: at a first wireless access point: selecting two or more of a plurality of client devices based on similarity of receive signal strength and carrier frequency offset with respect to the first wireless access point; sending a downlink multi-user multiple-input multiple-output (MIMO) transmission to the two or more of the plurality of client devices, the transmission configured to solicit acknowledgments from the two or more of the plurality of client devices; receiving the acknowledgments from the two or more of the plurality of client devices; and performing uplink multi-user MIMO processing of the acknowledgments from the two or more of the plurality of client devices to recover the acknowledgments respectively from each of the two or more of the plurality of client devices.

In another aspect, an apparatus is provided comprising: a plurality of transmit upconverters each coupled to a corresponding one of a plurality of antennas; a plurality of receive downconverters each coupled to a corresponding one of the plurality of antennas; a signal processor coupled to the plurality of transmit upconverters and the plurality of receive downconverters, wherein the signal processor is configured to: cause a downlink multi-user multiple-input multiple-output (MIMO) transmission to be sent to a plurality of client devices via the plurality of transmit upconverters, the transmission configured to solicit acknowledgments from two or more of the plurality of client devices; cause the plurality of receive upconverters to receive the acknowledgments from the two or more of the plurality of client devices; perform uplink multi-user MIMO processing of the acknowledgments from the two or more of the plurality of client devices to recover the acknowledgments respectively from each of the two or more of the plurality of client devices; select two or more client devices of the plurality of client devices; cause a downlink MIMO second transmission to be sent to the selected two or more client devices via the plurality of transmit upconverters, the second transmission configured to solicit an acknowledgment from each of the selected two or more client devices; and cause the plurality of receive upconverters to receive the acknowledgement from each of the selected two or more client devices.

In yet another aspect, a system is provided comprising: at least a first wireless access point; a plurality of client devices; wherein the first wireless access point is configured to: send a downlink multi-user multiple-input multiple-output (MIMO) transmission to a plurality of client devices, the transmission configured to solicit acknowledgments from two or more of the plurality of client devices; receive the acknowledgments from the two or more of the plurality of client devices; and perform uplink multi-user MIMO processing of the acknowledgments from the two or more of the plurality of client devices, including performing a least squares computation, to recover the acknowledgments respectively from each of the two or more of the plurality of client devices.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
at a first wireless access point:
selecting two or more of a plurality of client devices based on similarity of receive signal strength and carrier frequency offset with respect to the first wireless access point;

sending a downlink multi-user multiple-input multiple-output (MIMO) transmission to the two or more of the plurality of client devices, the transmission configured to solicit acknowledgments from the two or more of the plurality of client devices;
receiving the acknowledgments from the two or more of the plurality of client devices; and
performing uplink multi-user MIMO processing of the acknowledgments from the two or more of the plurality of client devices to recover the acknowledgments respectively from each of the two or more of the plurality of client devices.

2. The method of claim 1, wherein one or more of:
the downlink multi-user MIMO transmission includes a preamble that does not support user separation;
a Media Access Control (MAC) protocol between the first wireless access point and the plurality of client devices is used such that the two or more of the plurality of client devices are unaware that each may be simultaneously transmitting an acknowledgment but which acknowledgments from the two or more of the plurality of client devices are aligned within a cyclic extension interval;
the plurality of client devices do not support carrier frequency alignment to a reference; and
the first wireless access point is operating, with respect to the two or more of the plurality of client devices, at a range such that per-client ranging is not required and the alignment of the acknowledgments received at the first wireless access point is preserved.

3. The method of claim 1, wherein the selecting includes selecting the two or more of the plurality of client devices such that the two or more of the plurality of client devices have different wireless multipath characteristics with respect to the first wireless access point.

4. The method of claim 1, wherein the performing uplink multi-user MIMO processing of the acknowledgments is by the first wireless access point.

5. The method of claim 1, wherein the performing uplink multi-user MIMO processing of the acknowledgments is by a controller apparatus in communication with the first wireless access point.

6. The method of claim 1, further comprising:
additionally selecting two or more client devices of the plurality of client devices;
sending a multi-user downlink transmission to further solicit an acknowledgment from each of the additionally selected two or more client devices; and
receiving the acknowledgement from each of the additionally selected two or more client devices.

7. The method of claim 6, wherein the additionally selected two or more client devices are not client devices from which acknowledgments have not yet been successfully received for a most recent downlink multi-user MIMO transmission.

8. The method of claim 6, wherein the additionally selected two or more client devices are client devices from which an acknowledgment is inadequately received.

9. The method of claim 1, wherein a plurality of wireless access point devices that includes the first wireless access point device participate in the downlink MIMO transmission.

10. The method of claim 1, wherein the performing uplink multi-user MIMO processing is by each of a plurality of wireless access point devices that includes the first wireless access point device.

11. The method of claim 1, further comprising:
receiving a transmission from at least one of the two or more of the plurality of client devices;
measuring channel state information with respect to the at least one of the two or more of the plurality of client devices;
measuring carrier frequency offset with respect to the at least one of the two or more of the plurality of client devices; and
storing the channel state information and carrier frequency offset for use in the performing of uplink multi-user MIMO processing of block acknowledgments.

12. The method of claim 11, wherein a plurality of wireless access points including the first wireless access point receive the transmission from the at least one of the two or more of the plurality of client devices, and wherein each of the plurality of wireless access points measures channel state information and carrier frequency offset information.

13. The method of claim 12, further comprising storing the channel state information and the carrier frequency offset information at a controller apparatus.

14. The method of claim 13, wherein the controller apparatus is co-located with one of the plurality of wireless access points.

15. An apparatus comprising:
a plurality of transmit upconverters each coupled to a corresponding one of a plurality of antennas;
a plurality of receive downconverters each coupled to a corresponding one of the plurality of antennas;
a signal processor coupled to the plurality of transmit upconverters and the plurality of receive downconverters, wherein the signal processor is configured to:
cause a downlink multi-user multiple-input multiple-output (MIMO) transmission to be sent to a plurality of client devices via the plurality of transmit upconverters, the transmission configured to solicit acknowledgments from two or more of the plurality of client devices;
cause the plurality of receive upconverters to receive the acknowledgments from the two or more of the plurality of client devices;
perform uplink multi-user MIMO processing of the acknowledgments from the two or more of the plurality of client devices to recover the acknowledgments respectively from each of the two or more of the plurality of client devices;
select two or more client devices of the plurality of client devices;
cause a downlink MIMO second transmission to be sent to the selected two or more client devices via the plurality of transmit upconverters, the second transmission configured to solicit an acknowledgment from each of the selected two or more client devices; and
cause the plurality of receive upconverters to receive the acknowledgement from each of the selected two or more client devices.

16. The apparatus of claim 15, wherein one or more of:
the downlink multi-user MIMO transmission includes a preamble that does not support user separation;
a Media Access Control (MAC) protocol between the apparatus and the plurality of client devices is used such that two or more of the plurality of client devices are unaware that each may be simultaneously transmitting an acknowledgment but which acknowledgments from the two or more of the plurality of client devices are aligned within a cyclic extension interval;
the plurality of client devices do not support carrier frequency alignment to a reference; and
the apparatus is operating, with respect to the two or more of the plurality of client devices, at a range such that per-client ranging is not required and the alignment of the acknowledgments received at the first wireless access point is preserved.

17. The apparatus of claim 15, wherein the signal processor is further configured to:
measure channel state information with respect to the at least one of the plurality of client devices;
measure carrier frequency offset with respect to the at least one of the plurality of client devices; and
store the channel state information and carrier frequency offset for use in the performing of uplink multi-user MIMO processing of block acknowledgments.

18. A system comprising:
at least a first wireless access point;
a plurality of client devices;
wherein the first wireless access point is configured to:
send a downlink multi-user multiple-input multiple-output (MIMO) transmission to the plurality of client devices, the transmission configured to solicit acknowledgments from two or more of the plurality of client devices;
receive the acknowledgments from the two or more of the plurality of client devices; and
perform uplink multi-user MIMO processing of the acknowledgments from the two or more of the plurality of client devices, including performing a least squares computation, to recover the acknowledgments respectively from each of the two or more of the plurality of client devices.

19. The system of claim 18, wherein one or more of:
the downlink multi-user MIMO transmission includes a preamble that does not support user separation;
a Media Access Control (MAC) protocol between the first wireless access point and the plurality of client devices is used such that two or more of the plurality of client devices are unaware that each may be simultaneously transmitting an acknowledgment but which acknowledgments from the two or more of the plurality of client devices are aligned within a cyclic extension interval;
the plurality of client devices do not support carrier frequency alignment to a reference; and
the first wireless access point is operating, with respect to the two or more of the plurality of client devices, at a range such that per-client ranging is not required and the alignment of the acknowledgments received at the first wireless access point is preserved.

20. The system of claim 19, wherein the first wireless access point is further configured to:
measure channel state information with respect to the at least one of the plurality of client devices;
measure carrier frequency offset with respect to the at least one of the plurality of client devices; and
store the channel state information and carrier frequency offset for use in the performing of uplink multi-user MIMO processing of block acknowledgments.

* * * * *